Jan. 14, 1969 K. R. HUMES 3,422,215
INSULATED CABLE
Filed Feb. 16, 1967

WITNESSES
Robert C. Baird
Lee P. Johns

INVENTOR
Karl R. Humes.
BY
Frederick Slapor
ATTORNEY

United States Patent Office 3,422,215
Patented Jan. 14, 1969

3,422,215
INSULATED CABLE
Karl R. Humes, Lima, Ohio, assignor to Westinghouse Electric Company, Pittsburgh, Pa., a corporation of Pennsylvania
Filed Feb. 16, 1967, Ser. No. 616,610
U.S. Cl. 174—120          2 Claims
Int. Cl. H01b 7/00; H01b 13/08; H01b 13/26

ABSTRACT OF THE DISCLOSURE

An electrical conductor is insulated with an inner resinous fluorinated resin layer that is strippable from the conductor, an intermediate abrasion resistant polyimide resinous layer, and an outer layer of fluorinated resinous material carrying colored indicia, and the layers being bonded to one another.

---

Figure 1:
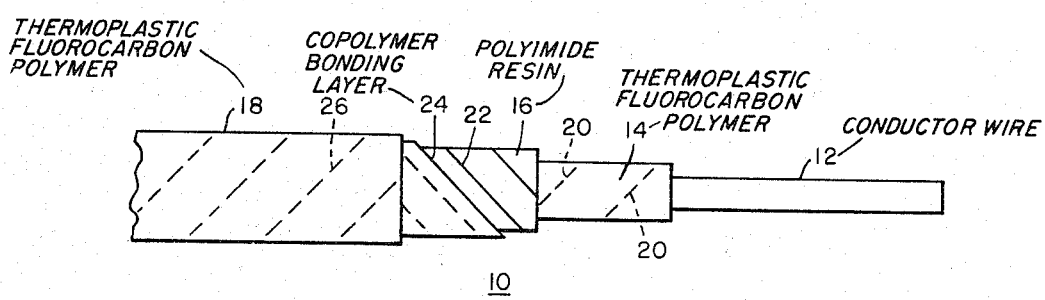

A need exists for insulation for electrical cable that is more resistant to rigorous operating conditions. Such insulation should not be affected by solvents, ozone, ultraviolet light and is usable at cryogenic temperatures as well as at elevated temperatures as high as 300° C. Moreover, it is preferred that the insulation have a combination of other properties such as a high resistance to abrasion, flexing and bending, resistance to cold flow and cut through, easy strippability from a wire, and ability to hold and retain indicia or colors on the outer surface identification purposes.

Various materials have been tried separately for achieving an electrical cable having electrical insulation satisfying most of the desired properties. Synthetic resinous materials such as tetrafluoroethylene, trifluoromonochloroethylene polyimides, and polyamide-imide (such as set forth in U.S. Patent 3,179,635) used separately have not met all of the foregoing requirements. Although polytetrafluoroethylene includes a number of properties which are highly satisfactory as insulation for cable which properties include easy strippability from a wire and gets ability to absorb color and print, polytetrafluoroethylene is unsatisfactory because of its cold flow characteristics. Likewise, polyimides are highly satisfactory insulation material for wire because of its high resistance to abrasion; however, it is very difficult to strip from a wire without nicking the wire. In addition, polyimides will not readily absorb and retain print or color for color coding purposes. Other synthetic materials are unsatisfactory as wire insulation for various reasons.

It has been found in accordance with this invention that polytetrafluoroethylene and polyimide resin may be combined in a specified manner as a laminated insulation for electric cable which overcomes the foregoing problems and is a very definite improvement over prior existing insulated cables.

Briefly, the present invention may be stated generally as including a cable having fused insulation applied to wire composed of an electrically conductive material, a first layer of polytetrafluoroethylene or trifluoromonochloroethylene resin on the wire which resin is easily strippable from the wire, a second layer of a polyimide or polyamide-imide resin on the first layer, the second layer having at least one surface covered with a layer of fluorinated ethylene polymer, a third layer of material similar to the first layer on the second layer, and at least one of the first and third layers being bonded to the second layer by the fluorinated ethylene polymer resinous layer on the second layer.

The present invention also includes a method for applying a fused insulation to an electrical cable including the steps of applying a first layer of thermoplastic fluorocarbon polymer on a wire, applying a second layer of a polyimide resin on the first layer, applying a third layer of a thermoplastic fluorocarbon polymer on the second layer, fusing the first and third layers of thermoplastic fluorocarbon polymers by heating the coated wire to a temperature of from 700 to 850° F., and cooling the cable to room temperature.

Accordingly, it is an object of this invention to provide an insulated cable the wire conductor of which is fully sealed by three layers of plastic material which are tightly bonded together and which will not delaminate.

It is another object of this invention to provide an insulated cable composed of three layers of plastic material which insulation is easily stripped from the conductor wire either by hand or machine.

It is another object of this invention to provide an insulated cable which is highly resistant to abrasion and which is susceptible to identification by printing and/or color indicia.

It is another object of this invention to provide an insulated cable which is not affected by solvents, ozone, ultraviolet waves and the like and which can be used at cryogenic as well as at elevated temperatures.

Finally, it is an object of this invention to satisfy the foregoing problems and desiderata in a simple and effective manner.

Figure 2:
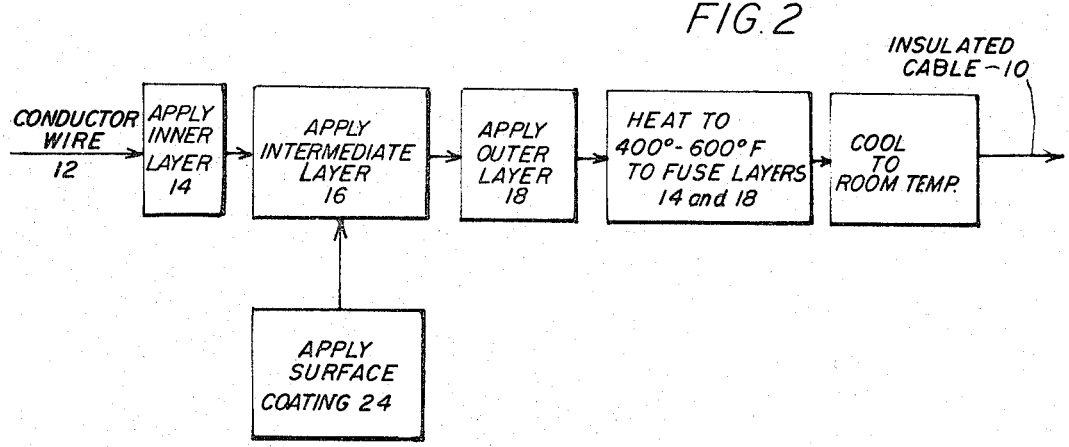

These and other objects and advantages of the present invention will become more apparent when considered in view of the following detailed description and drawing which FIGURE 1 is an elevational view showing three layers of electrical insulation on an electrical conductor, and FIG. 2 is a flow chart illustrating the method of this invention.

As an illustration of the present invention reference should be had to FIGURE 1, wherein an insulated cable generally indicated at 10 includes an electrical conductor wire 12, an inner coating or layer 14, an intermediate coating or layer 16, and an outer coating or layer 18. The wire 12 is composed of metal such, for example, as solid or stranded silver plated copper, aluminum, or tin plated copper of any conventional wire size such as 18 gauge. The first layer 14 is composed of a thermoplastic fluorocarbon polymer such as polytetrafluoroethylene resin or trifluoromonochloroethylene resin which is applied either as an extrusion or as a tape wrap, which latter tape may have a width of from one quarter to three quarter inch and is applied as one or more butted layers which are indicated by the broken spiral lines 20. The tape may have a thickness ranging from ½ to 2 mils, and a preferred thickness being about 1 mil.

The second or intermediate layer 16 is a polyimide resin which is preferably applied in tape form, for example, in a half lapped spiral wrapping, the tape having a width of about one quarter to three quarter inch and a thickness of up to 6 mils, and having a coating of the fluoroethylenehexafluoropropylene copolymer of a thickness ranging from a quarter to 1 mil (0.00025 to 0.001 inch) on one or both surfaces. The preferred thickness of the layer 16 is ½ mil. The edges of the lapped tape wrapping are indicated by the spiral lines 22.

The intermediate layer 16 is preferably provided with a surface coating 24 of a bonding material prior to wrapping, the bonding material being the copolymer of tetrafluoroethylene and hexafluoropropylene which copolymer is applied to either the inner or outer surface or both of the tape 16. The copolymer for example may be prepared by reacting from 20 to 80 parts by weight of tetrafluoroethylene and from 80 to 20 parts by weight of fluoropropylene. Such copolymer is available commercially. Other bonding materials other than the copolymer for bonding the layers 12–14–16 together may be employed.

The third or outer layer 18 preferably has a composition similar to the first or inner coating 14. The outer coating 18 is applied in the same manner as the inner coating 14 to provide a butted spiral wrapping having edge lines 26. Such material is advantageous for the outer layer because it readily absorbs and retains color pigments used for printing and other coding identification that is conventionally used for color coding of electrical cable.

After the three layers 14, 16, and 18 are applied to the wire 12 substantially as shown in the flow chart of FIG. 2, the assembly is heated to a temperature ranging from 450 to 600° F., the preferred temperature being 500° F. The purpose of the heating operation is to fuse the adjacent edges forming spiral lines 20 and 26 of the tapes forming the inner and outer layers 14 and 18 together whereby the edges 20 and 26 disappear and form a continuous sheath. Inasmuch as the intermediate layer 16 is composed of a polyimide resin, it is unaffected by heating in the temperature range of 450 to 600° F. to which the assembly is heated. However, the surface coating 24 of tetrafluoroethylene resin and hexafluoropropylene resin fuses to form a bond with the adjacent coating or coatings 14 and 18 so that upon cooling from the heating a complete seal is obtained between the intermediate layer 16 and the inner layer 14 and outer layer 18 or both if the inner and outer surfaces of the tape 16 are coated with the coating 24. As a result of the tight bond between the three coatings no delamination will occur therebetween during subsequent use of the cable 10 in which it is bent, flexed, coiled or handled roughly.

*Example*

A series of cables were prepared having wire sizes and layer dimensions as follows:

| Wire Size in AWG | Wire dimension, inch | Inner layer dimension | Intermediate layer dimension | Outer layer dimension |
|---|---|---|---|---|
| 20 (19/32) | .040 | .049 | .057 | .072 |
| 18 (19/30) | .049 | .058 | .066 | .081 |
| 16 (19/29) | .057 | .066 | .074 | .089 |
| 14 (19/27) | .072 | .081 | .089 | .104 |
| 12 (19/25) | .090 | .099 | .107 | .160 |

The wires were stranded silver plated copper conductors. The inner and outer layers were polytetrafluoroethylene resin. The intermediate layers were polyimide resins having opposite sides coated with a mixture of tetrafluoroethylene resin and hexafluoropropylene resin. This combination of materials resulted in fully sealed insulation coverings for the conductors. All three layers were tightly bonded together and no delamination occurred. Each layer served a specific function. The inner layer adjacent to the conductor permitted easy stripping by hand or machine. The intermediate layer added outstanding mechanical properties including resistance to abrasion and cut through. The outer layer served the double purpose of strippability and color identification. The combination of layers provided a superior insulation that was unaffected by solvents, ozone, and ultraviolet light, and was usable at cryogenic temperatures as well as temperatures up to 300° C.

Accordingly, an insulated cable is provided which provides a resistance to abrasion and cut through in which coating is at the same time readily strippable by hand or machine due to the inner coating of a material such as polytetrafluoroethylene. As a result of the inner coating, the entire laminated coating may be stripped from the wire without nicking the surface of the wire itself. Finally, the outer coating of a material such as polytetrafluoroethylene resin carries an application of identifying insignia such as printed indicia or a colored stripe or pattern which cannot be permanently applied to the intermediate coating of polyimide resin. The primary purpose of the latter is to provide abrasion resistance to the entire coating. Such pigments or dyes are suspended in a halogenated solvent for example, and applied by a brush, a stamp or the like to the heat treated cable. The solvent is selected to penetrate slightly into the outer layer so that after evaporation the pigment or dyes remains in the outer layer.

Various modifications may be made within the spirit of the invention.

What is claimed is:

1. An insulated cable comprising an electrically conductive wire an innermost layer of thermoplastic fluorocarbon polymer on the wire, an intermediate layer of a polyimide resin on the innermost layer, an outer layer of a thermoplastic fluorocarbon polymer on the intermediate coating, a coating of a copolymer of tetrafluoroethylene and hexafluoropropylene on at least one surface of the intermediate layer whereby the intermediate layer is boned to one of the inner and outer layers, at least one of the inner and outer layers being fused to form a continuous sheath, the layers being bonded to one another, and the inner coating being readily separable from the wire.

2. A method of making an insulated cable including the steps of applying an inner coating of a thermoplastic fluorocarbon polymer tape on a conductive wire, applying a layer of copolymer of tetrafluorocarbon and hexafluoropropylene to at least one surface of an intermediate coating tape; applying the intermediate coating of a polyimide resin tape on the inner coating, applying an outer coating of a thermoplastic fluorocarbon polymer tape on the intermediate coating, and heating the coatings to a temperature ranging from about 450° to 600° F. to cause at least one of the inner and outer coatings to bond to an adjacent layer and to fuse the edges of tapes of the inner and outer coatings together to form a seamless sheath thereof.

References Cited

UNITED STATES PATENTS

| 1,845,041 | 2/1932 | Boving. | |
| 3,054,710 | 9/1962 | Nixon | 174—112 X |
| 3,168,417 | 2/1965 | Smith | 174—120 X |

LEWIS H. MYERS, *Primary Examiner.*

ELLIOTT A. GOLDBERG, *Assistant Examiner.*

U.S. Cl. X.R.

117—218; 156—53